July 7, 1936.    H. K. RICHARDSON    2,046,413
BURNER CONTROL APPARATUS
Filed May 7, 1932
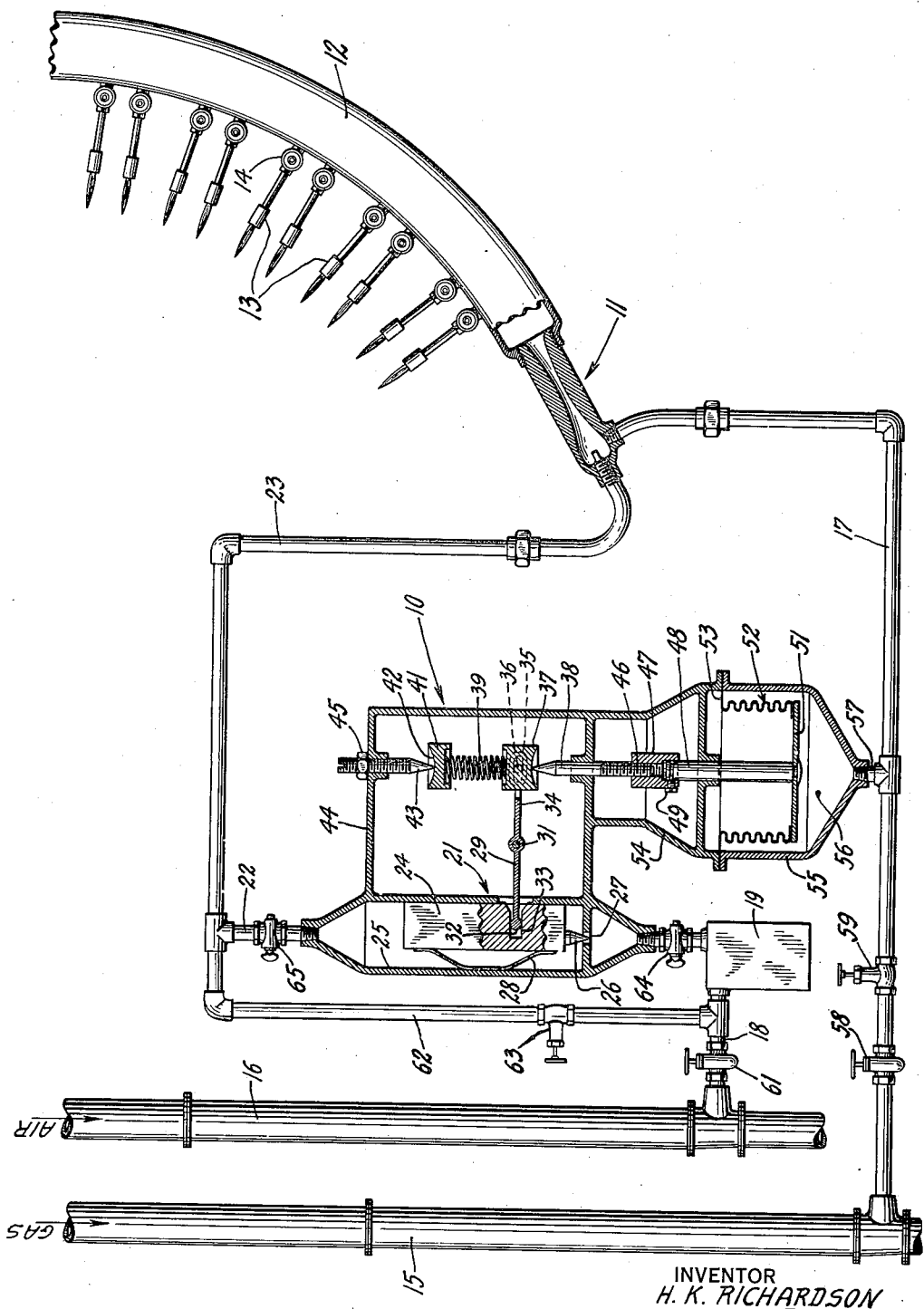
INVENTOR
*H. K. RICHARDSON*
BY *M. F. Rogers*
ATTORNEY Patented July 7, 1936

2,046,413

UNITED STATES PATENT OFFICE 2,046,413

BURNER CONTROL APPARATUS

Henry K. Richardson, Bloomfield, N. J., assignor to Westinghouse Lamp Company, a corporation of Pennsylvania Application May 7, 1932, Serial No. 609,824

9 Claims. (Cl. 158—119)

This invention relates to a gas flame control apparatus and relates more particularly to apparatous in which a plurality of gas flames are employed in connection with glass working operations.

In the manufacture of certain glass articles wherein glass working parts are united into an integral structure by fusion, as for example, in connection with the making of electric incandescent lamps, it is necessary to provide heating means in the form of a plurality of gas flames.

In factories in which glass working operations are performed it is, of course, the practice to provide means for regulating the gas pressure as the gas is delivered through the main supply. Means are also provided to regulate the flame length and temperature of gas by controlling the pressure in accordance with the variations in the gas composition.

Although such apparatus is useful in certain types of machines it does not give sufficient regulation when it is desirable to have a common manifold for a multiplicity of gas burners and a single gas and air mixer, and to vary the number of flames in use. In such cases it has been found that when one or more of the flames are turned down, under normal conditions the pressure rises, increasing the flow in all the other burners disturbing the fire settings and a back pressure is set up in the gas line leading to the mixer. This disturbance of the fire settings is of extreme importance since the temperature of the flames must be definite in order to provide sufficient heat for the fusing operations particularly when employed with automatic machines where glass parts are moved to position for heating and are moved away after a definite time interval.

In accordance with the present invention, the above disadvantages are corrected and the gas and air ratio is maintained while the manifold pressure is held constant. This is accomplished by utilizing the back pressure of the gas, resulting from the closing of one or more burner valves, to operate means for regulating the air supply. Thus, a manifold may have any given number of burners and may be set so that the burners operate with flames of definite length and temperature and when one or more of the flames is turned down the gas and air fed to the mixer is immediately regulated to maintain the remaining flames at definite lengths and temperatures.

It is an object of the present invention, therefore, to provide a device wherein one or more of a series of burners may be cut off or adjusted as to quantity without lowering or otherwise reducing the effectiveness of the remaining burners.

Another object of the invention is to provide a manifold having a plurality of burners with means for automatically regulating the air supply.

Another object of the invention is to provide a plurality of burners with an air inlet and a gas inlet so arranged that the pressure in the gas inlet regulates the amount of air flowing through the air inlet.

Other objects and advantages of the invention will be apparent from the following description together with the single figure in the accompanying drawing.

The invention is illustrated more or less diagrammatically and comprises control device 10, a gas and air mixer 11 which may be of the Venturi type properly proportioned for the present use, a manifold 12 having connected therewith a plurality of burner nozzles 13 each of which is provided with a cut-off valve 14. A main gas supply pipe 15 and a main air supply pipe 16 are provided. The main gas supply pipe 15 is connected to the mixer 11 by means of conduit or supply pipe 17. The main air supply pipe 16 is connected to the mixer 11 by means of a connection 18, an air filter 19, a valve 21, a nipple 22 and conduit 23.

The valve 21 includes a slide block 24 movable in a casing 25 and having a pin 26 arranged to seat in an orifice 27 in the casing. The block 24 may be held by a spring 28 and is movable vertically within the casing 25 to bring the pin into and out of the orifice 27. A lever 29 fulcrumed at 31 is provided with one end 32 disposed in a slot 33 in the slide block so that an oscillation of the end 32 of the lever will raise or lower the slide block to open or close the orifice 27.

The opposite end 34 of the lever 29 is provided with a forked end 35, the tines of which are provided with slots to receive pins 36 on opposite sides of an adjuster block 37. The block 37 is held in contact with an adjustable pin 38 by means of an expansion spring 39. The spring 39 is disposed between the block 37 and a stop member 41 having a curved surface 42 to receive one end of an adjustable pin 43 threadedly disposed in a casing 44 which is integral with casing 25 and held by a lock nut 45. An end 46 of the pin 38 is threadedly attached to a coupling 47 which coupling is secured to one end of a push rod 48 secured to the coupling by set screw 49.

The opposite end of the push rod is secured to a plate 51 of a bellows-type diaphragm 52 having its flanges 53 secured between an extension 54 of the casing 44 and extension casing 55 so as to constitute a pressure chamber 56. This pressure chamber is connected by a nipple 57 with the conduit 17 so that the chamber 56 contains gas at the same pressure as the gas in the conduit 17. The conduit 17 is provided with a gate valve 58 to admit gas from the main 15, and is also provided with a needle valve 59 to regulate the pressure of the gas fed to the mixer 11. The connection 18 leading from the main air supply to the air filter 19 is provided with a gate valve 61 to admit air to the control device 10 which serves to regulate the air pressure through the conduit 23 which leads to the mixer 11.

If desirable, air fed from the pipe 16 may be by-passed about the control device 10 and for this purpose a conductor 62 as shown may be provided and a needle valve 63 may be employed for regulating the pressure of the air fed to the mixer. When the by-pass is used, the control device may be cut off and for this purpose cut-off valves 64 and 65 are provided. It is to be understood that by-pass 62 is not employed in accordance with the present invention but serves as a means for operating the burners in the event that it is necessary to adjust or otherwise terminate the action of the control device.

The control device employed serves to maintain an air-gas ratio and a constant manifold pressure. The manifold 12 may be provided with a definite number of burners which may all be operated in which case the control device will be set so that a definite amount of air is passed to the manifold. Likewise, the needle valve 59 in the gas pipe 17 will be adjusted to provide the proper gas pressure.

During the normal operation of the burners the pressure in the chamber 56 will be the same as the pressure in the pipe 17. If, however, one or more of the burners is cut off a back pressure in the gas pipe will occur causing the bellows diaphragm to actuate and force the push rod 48 to move, thereby lifting the end 34 of the lever 29 and causing the pin 26 to enter the orifice 27 to cut down the air supply.

The adjustments may be so made that the amount of air cut off by the pin 26 is the correct amount to keep the air gas ratio constant and to cause a drop in the air pressure to the extent that the manifold pressure stays constant. The type of mixer employed together with the taper of the pin 26 and the area of the orifice 27 control the gas and air pressures in use. It has been found that with the proper relative proportions of the elements a change in gas consumption of 15 per cent does not affect the air gas ratio by more than 1 per cent. To change the air gas ratio, the pin 43 may be used to adjust the quantity of air flowing while the valve 59 in the gas pipe may be used to change the quantity of gas flowing. Either of these adjustments makes a change in the operating pressure in the manifold.

When the present apparatus is to be used with a given number of flames, the flames are set for approximately the right mixture and flame length, then the valve 59, adjustment pins 38 and 43 are adjusted until the pressure gauge connected to the manifold of suitable type (not shown) remains constant within 1 per cent when 15 per cent manifold load is removed. After this first adjustment, the position of the adjustment pin 38 should not be altered.

It has been found that when making the setting care should be taken to have the valves on the manifold burners three-quarters open which will give a manifold pressure of sufficient range for valve changes.

It has also been found that adjustment of fires necessary to take care of changes in glass thickness or glass quality; that is, changes in B. T. U.'s, can be made up to 15 per cent on the individual burners without disturbing the control or adjustment pins 38 and 43. If a change in the glass quality is abnormal, a slight adjustment of the adjustment pin 43 increases or decreases the air and such adjustment on valve 59 similarly affects the gas.

By reason of the present invention it is possible to provide an apparatus wherein a constant working condition is always maintained insofar as the fires are concerned and in which the disadvantage of variations in temperature due to the use of varying numbers of flames, is avoided.

Although a preferred embodiment of the invention is shown and described herein, it is to be understood that modifications may be made therein without departing from the spirit and scope of the invention as set forth in the appended claims.

I claim:
1. A gas flame control apparatus comprising a gas and air manifold having a plurality of burners, a gas and air mixing chamber connected to said manifold, an air pipe for supplying air to said chamber, a gas pipe for supplying gas to said chamber, a diaphragm, means for subjecting said diaphragm to the pressure of the gas in said pipe, and an oscillatory member movable by said diaphragm for decreasing the flow of air in said air pipe upon an increase in the pressure of gas in said gas pipe.

2. An apparatus of the class described comprising a manifold having an outlet of a predetermined area for ignited gas and air, a gas pipe and an air pipe communicating with said manifold, means for regulating the flow of air in said air pipe, means movable in accordance with variations in pressure of said gas in said gas pipe and a member for translating motion to said first mentioned means for decreasing the air supply in said air pipe upon an increase in the gas pressure in said gas pipe.

3. An apparatus of the class described comprising a manifold having an outlet of a predetermined area for ignited gas and air, a gas pipe and an air pipe communicating with said manifold, means for regulating the flow of air in said air pipe, means movable in accordance with variations in the gas pressure and mechanical means operated by said second mentioned means for translating motion to said first mentioned means for decreasing the flow of said air upon an increase in the gas pressure in said gas pipe.

4. A gas burner having a mixing chamber, an air conduit leading to said chamber, a gas conduit leading to said chamber, air regulating means for said air conduit, pressure controlled means responsive to the pressure of gas in said gas conduit and a member intermediate said first and second mentioned means operable to translate motion from said pressure controlled means to said air regulating means for decreasing the supply of air upon an increase in the pressure of the gas in said gas pipe.

5. A gas burner having a mixing chamber, an air conduit leading to said chamber, a gas conduit leading to said chamber, air regulating means for said air conduit, pressure controlled means responsive to the pressure of gas in said gas conduit and a member intermediate said air regulating means and said pressure controlled means, said member having one portion arranged to be moved by said pressure controlled means and another portion arranged to move said air regulating means to decrease said air supply upon an increase in the pressure of said gas.

6. A gas burner having a mixing chamber, an air conduit leading to said chamber, a gas conduit leading to said chamber, air regulating means for said air conduit, pressure controlled means responsive to the pressure of gas in said gas conduit and an oscillatory member having a pivot point intermediate said air regulating means and said pressure controlled means, one end of said member being arranged to be moved by said last mentioned means and the other end arranged to actuate said first mentioned means to decrease said air supply upon an increase in the pressure of the gas in said gas conduit.

7. A gas burner having a mixing chamber, an air conduit leading to said chamber, a gas conduit leading to said chamber, air regulating means for said air conduit, pressure controlled means responsive to the pressure of gas in said gas conduit and an oscillatory member having a pivot point intermediate said air regulating means and said pressure controlled means, one end of said member being arranged to be moved by said last mentioned means and the other end arranged to actuate said first mentioned means, and means for moving said member in opposition to movement imparted by said pressure controlled means to decrease the supply of said air upon an increase in the pressure of the gas in said gas conduit.

8. A gas flame control apparatus comprising a gas and air manifold having a plurality of burners, a gas and air mixing chamber, an air inlet pipe for supplying air to said chamber, a gas inlet pipe for supplying gas to said chamber, a diaphragm controlled by the pressure in said gas pipe, a valve in said air pipe, and means intermediate said valve and diaphragm for varying the flow of air in said air pipe upon an actuation of said diaphragm under the pressure of gas in said gas pipe, inversely as the gas pressure.

9. A gas flame control apparatus comprising a gas and air manifold having a plurality of burners, a gas and air mixing chamber, an air inlet pipe for supplying air to said chamber, a gas inlet pipe for supplying gas to said chamber, a diaphragm operable under the pressure in said gas pipe, an adjustable valve for regulating the flow of air in said air pipe and a lever member operable under the action of said diaphragm for controlling said valve to vary the amount of air admitted to said manifold inversely with the variation in the pressure of gas in said gas pipe.

HENRY K. RICHARDSON.